Figure 1:
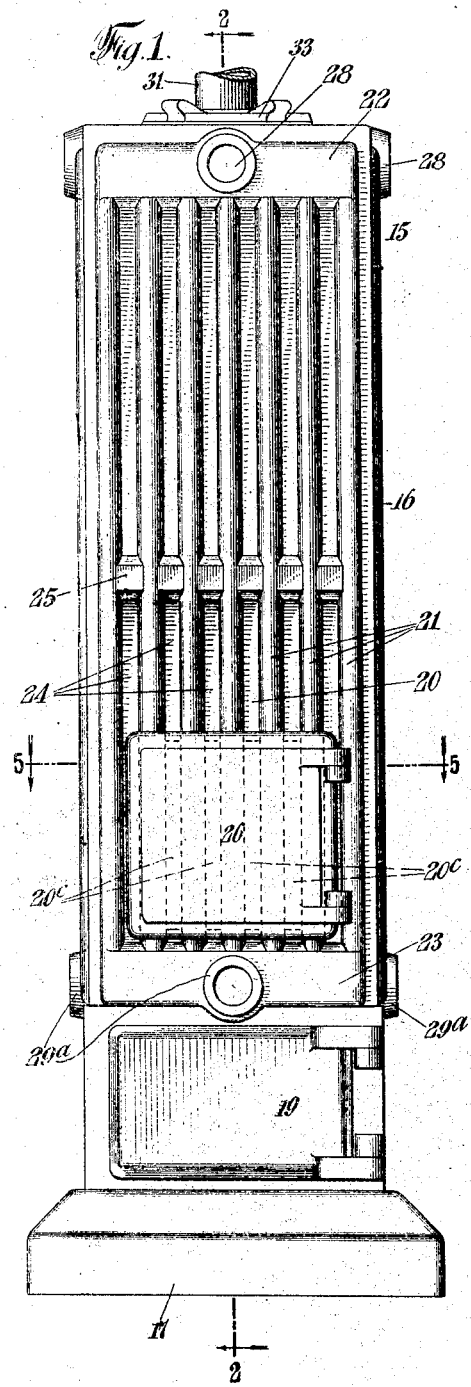

L. COURTOT.
COMBINED STOVE AND HOT WATER HEATER.
APPLICATION FILED APR. 29, 1914.

1,172,768.

Patented Feb. 22, 1916.
3 SHEETS—SHEET 1.

Witnesses:
Edwin H. Ourtwich
A. Ross.

Inventor
LOUIS COURTOT
By Conrad A. Wretsch
his ATTORNEY.

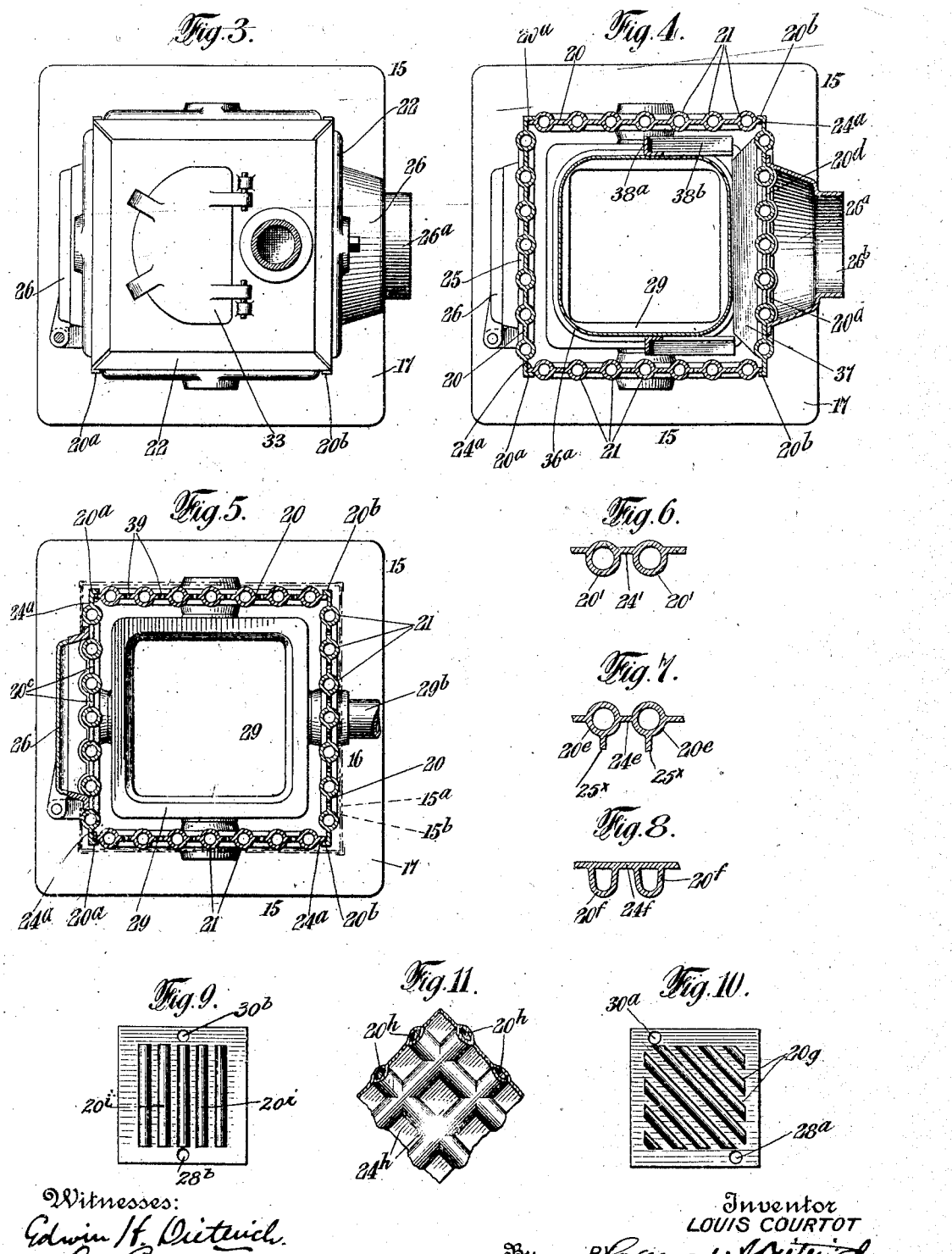

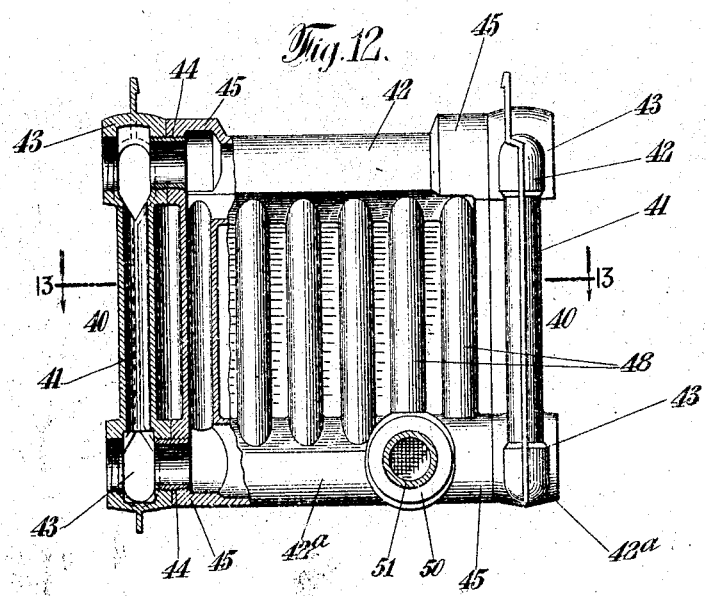
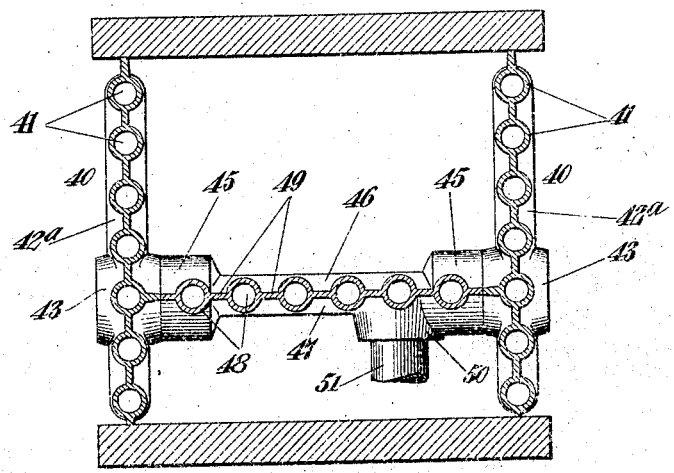

UNITED STATES PATENT OFFICE.

LOUIS COURTOT, OF PARIS, FRANCE, ASSIGNOR TO AMERICAN RADIATOR COMPANY, OF CHICAGO, ILLINOIS, A CORPORATION OF NEW JERSEY.

COMBINED STOVE AND HOT-WATER HEATER.

1,172,768.

Specification of Letters Patent.

Patented Feb. 22, 1916.

Application filed April 29, 1914. Serial No. 835,109.

*To all whom it may concern:*

Be it known that I, LOUIS COURTOT, a citizen of the Republic of France, residing at Paris, in the Republic of France, have invented and discovered certain new and useful Improvements in Combined Stoves and Hot-Water Heaters, of which the following is a full, clear, and exact specification.

My invention relates to improvements in heating apparatus and the same has for its object more particularly to provide a stove of small size for heating small buildings or apartments.

Further said invention has for its object to provide a heating apparatus which, when so desired, can be made to serve as a primary heater for the room or space in which same is located, and as a secondary heater for heating rooms or portions of a building at a point distant or removed from the room in which the stove is located.

Further said invention has for its object to provide a stove of the character specified, comprising a plurality of panels secured together to form a receptacle of any desired size and shape, to inclose the grate, fire-pot and combustion chamber of the stove.

Further said invention has for its object to provide a stove comprising a plurality of panels, each having a series of water tubes formed integrally therewith and communicating at one or both of their ends with headers, which are also formed integrally with said panels and tubes.

Further said invention has for its object to provide a stove comprising a plurality of suitably shaped panels adapted to be secured together to form inclosing walls for the grate, firepot and combustion chamber, and also, when desired, to form the partitions or flues therein; each of said panels embodying a series of integrally formed water tubes communicating at one or both of their ends with a suitably formed header or headers, also formed integrally with said panel.

Further said invention has for its object to provide a stove having one or more of the inclosing walls for the grate, firepot and combustion chamber formed of a panel or a series of panels, each of which consists of a plurality of tubes, having one or both of its ends connected by a suitable header or headers, and their intermediate portions connected by integral webs to form a panel, and said tube portions having a wall or metal line of predetermined thickness and an external diameter so proportioned as to give a low value to the ratio of the transverse cross sectional area of the metal line relative to the external surface thereof per unit length of tube.

Further said invention has for its object to provide a stove of the character hereinabove specified, which by incorporating the feature above mentioned, shall be smaller and lighter for a given capacity than is possible to attain in hot water heaters now in use.

To the attainment of the aforesaid objects and ends my invention consists in the novel details of construction, and in the combination, connection and arrangement of parts hereinafter more fully described and then pointed out in the claims.

Figure 2:
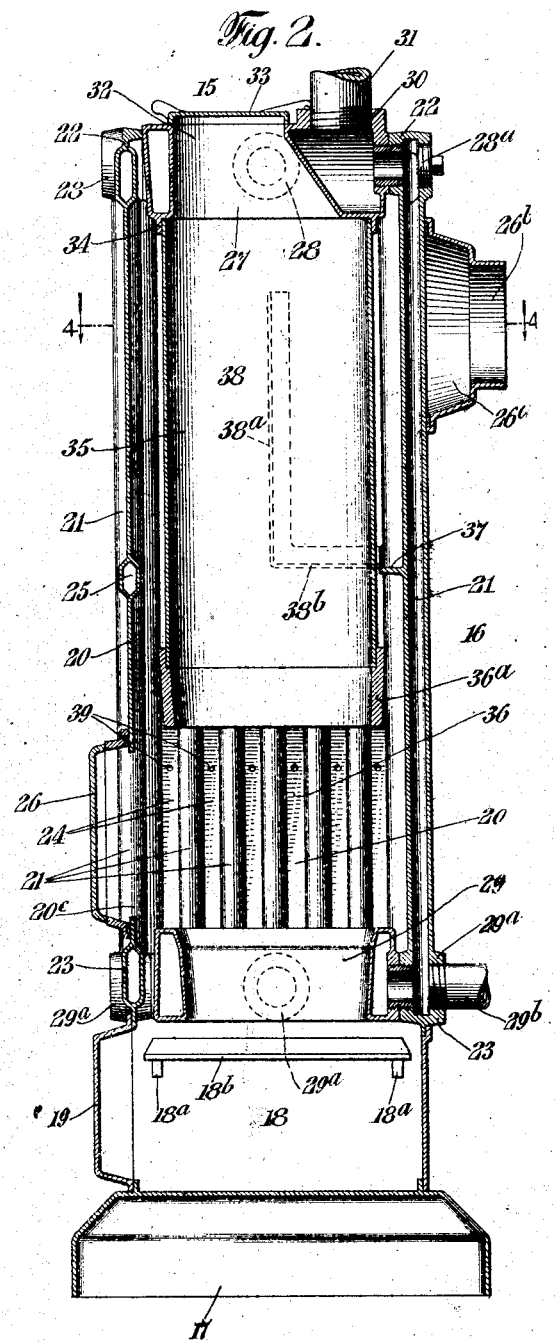

In the accompanying drawings forming part of this specification, wherein like numerals of reference indicate like parts,—Figure 1, is a front elevation showing one form of combined stove and hot water heater constructed according to, and embodying my said invention; Fig. 2, is a central vertical section taken on the line 2—2 of Fig. 1; Fig. 3 is a top view; Fig. 4 is a transverse section taken on the line 4—4 of Fig. 2; Fig. 5 is a similar view taken on the line 5—5 of Fig. 1, and also showing, in broken lines, an inclosing casing surrounding the stove; Figs. 6, 7 and 8 are enlarged detail cross sectional views illustrating modified forms of panels constituting the whole or a part of the inclosing walls for the grate, firepot, combustion chamber and related parts of the stove; Figs. 9 and 10 are side views of complete panels illustrating respectively vertical and inclined tubes formed integrally therewith; Fig. 11 is an enlarged detail side view, showing a further modified form of panel, in which the tubes are arranged at right angles to each other and crossing; Fig. 12 is a diagrammatic view showing a modified form of stove in which the rear panel serves as a baffle plate or partition over the top of which the hot gases and products of combustion must pass on their way to the uptake, and Fig. 13 is a section taken on the line 13—13 of Fig. 12.

In the said drawings, 15 designates the stove as a whole, which is here shown as having a body portion 16, of rectangular outline, mounted upon a base 17, and an ashpit portion 18, mounted thereon, which is provided at its front with the usual door 19, for obtaining access to the interior of said ashpit. Adjacent to the upper edge of the ashpit 18, are provided supports 18ª, 18ª, to receive and support a grate 18ᵇ.

The body portion 16, of the stove is composed of four similarly-shaped panels 20, 20, each formed of a series of vertically-arranged tubes 21, 21, having their upper and lower ends cast integrally with comparatively flat horizontal headers 22, 23, respectively, and the portions intermediate of said tubes 21, 21, connected together by integrally formed webs 24, 24. Where the tubes are of greater length, or where a panel of one length is to be connected with a panel of different length, one or more intermediate headers or connecting sections as 25, may be provided.

The vertical edges of the front and rear panels 20, 20, are provided with rearwardly and forwardly extending flanges 20ª, 20ᵇ, respectively, which are bolted or otherwise secured to the projecting web portions 24ª, 24ª, formed at the front and rear edges of the side panels 20, 20.

The front panel 20, has the webs connecting the tubes cut away adjacent to its lower end, to form a series of vertical openings 20ᶜ, 20ᶜ, constituting a vertical grate which is closed by a fire door 26, and the rear panel 20, adjacent to its upper end, has portions of the webs connecting the several tubes cut away to form a series of vertical openings 20ᵈ, 20ᵈ, leading to a smoke box 26ª, which is suitably secured at one end to the said rear panel, and has its other end 26ᵇ, formed to receive one end of a smoke pipe or flue leading to the chimney.

27 denotes a hollow, rectangular connecting member which is secured in the top of the stove, and is connected by nipples 28, 28 with the four headers 22, 22, provided at the upper ends of said panels 20, 20, in order to establish a proper circulation or exchange of fluid in said panels and the tubes thereof. The rear nipple has its outer end threaded to receive a cap or plug 28ª.

29 denotes a similar hollow, rectangular connecting member which is secured to the lower ends of the panels 20, 20, by four nipples 29ª, 29ª. The nipple 29ª of the rear panel 20, has its outer end screw-threaded to receive the end of a return pipe 29ᵇ, and the upper rectangular member 27, is provided in its upper surface with a threaded opening 30, to receive an outlet pipe 31, leading to the heating apparatus, and a semi-circular fuel opening 32, provided with a hinged cover 33.

The lower surface of the upper rectangular member 27, is provided with a depending flange 34, within which is suitably secured the upper end of a fuel magazine 35, whose lower end extends downwardly into the stove and terminates at a point sufficiently above the grate to provide a combustion chamber 36.

36ª denotes an angular collar, which is secured upon the lower end of the fuel magazine and serves to reinforce the same at that point.

Upon the inner side of the rear panel 20, about midway of its height is arranged a horizontal partition or baffle plate 37, which extends forwardly to the rear wall of the fuel magazine 35, and at each side of said fuel magazine 35, is disposed an angular baffle plate 38, comprising a vertical section 38ª, and a horizontal section 38ᵇ, whose rear end terminates adjacent to the forward edge of the horizontal baffle plate 37.

39, 39 denote auxiliary air inlets which may be provided in the webs 24, 24, in one or more of the panels 20, 20 at such point or points above the grate as will best insure the proper mixture of air with the gases liberated in the combustion chamber.

Each panel 20, is composed of a plurality of separated thin walled tubes, whose metal line is of such predetermined or calculated thickness, and whose external diameter is of such proportion as to give a low value to the ratio which the transverse cross sectional area of said metal line bears relative to the external surface per unit length of tube.

When it is desired to use the apparatus only as a secondary heater, the same may be inclosed by an outer shell or jacket 15ª, and a lining of asbestos 15ᵇ, as indicated in Fig. 5, in order to prevent the apparatus imparting any material amount of its heat to the chamber within which the same is located.

At Figs. 6, 7 and 8, I have shown a series of modified forms of panels and tubes. In the construction illustrated at Fig. 6 the tubes 20′, 20′ are shown connected by webs 24′, 24′, arranged eccentrically. At Fig. 7, the tubes 20ᵉ, 20ᵉ are shown connected by intervening webs 24ᵉ, 24ᵉ, which are arranged centrally of the tubes, and upon the outer surfaces of said tubes are provided vertical, longitudinal ribs 25ˣ, 25ˣ. At Fig. 8, the tubes 20ᶠ, 20ᶠ are shown as substantially U-shaped in cross section, and their ends formed integrally with webs 24ᶠ, which in this instance form a flat plate on one side.

At Fig. 9 is shown a panel having parallel, vertical tubes 20ⁱ, 20ⁱ, and the panel provided at its middle adjacent to its lower edge with an inlet opening 28ᵇ, and adjacent to its upper edge with an outlet opening 30ᵇ.

At Fig. 10 is shown a modified form of panel, in which the tubes 20ᵍ, 20ᵍ, are arranged in inclined position and parallel to each other. In this construction the inlet opening 28ʰ is arranged at the base of the plate adjacent to one of the vertical edges of the panel, and the outlet opening 30ª, arranged at the upper edge of the plate adjacent to the opposite vertical edge of the panel.

At Fig. 11, the panel is shown as having formed therein vertical series of parallel inclined tubes 20ʰ, 20ʰ, which intercommunicate and form rectangular connecting webs 24ʰ, 24ʰ.

In the modified form of construction shown at Figs. 12 and 13, I have illustrated a stove, in which the front and rear walls are made of solid material, such as metal, fire brick, tile or other suitable material, and only the two side walls formed of panels 40, 40, each of which comprises a series of tubes 41, 41, connected together at their upper and lower ends by headers 42, 42ª, respectively. The upper and lower headers 42, 42ª of said side panels 40, 40 are provided adjacent to their rear edges with bosses 43, 43, into which are fitted nipples 44, 44, which also extend into bosses 45, 45, arranged at the opposite edges of the headers 46, 46 at the opposite ends of an intervening transverse panel 47, having vertical tubes 48, maintained in separated relation by integrally formed webs, 49, 49. In this construction the upper edge of the transverse panel 47 is disposed in a horizontal position somewhat below the upper edges of the side panels, so as to form an outlet over which the heated gases and products of combustion may pass, and thence proceed downwardly behind said panel to the flue or uptake. The header 42ª of the intermediate transverse panel 47, is provided in its rear side with a boss 50, to receive a return pipe 51, leading from the heating apparatus. In this modification it will be noted, that the side panels and transverse, intermediate panels are connected directly to each other instead of being brought into communication with each other at their upper and lower ends by means of rectangular connecting members, as shown at Figs. 1 to 5 inclusive.

It will be noted that while a stove embodying my invention hereinabove described may be used simultaneously as a primary heater for heating the chamber wherein the same is located, and for heating one or more chambers adjacent to or removed from the chamber wherein said stove is located, the same may also be used for heating only a chamber or chambers, adjacent to or removed from the chamber in which said stove is located. In the latter case the stove should be properly inclosed or jacketed to prevent unnecessary waste of heat.

Further it is to be noted that while I have shown the stove as composed of four panels arranged at right angles to each other, the number of said panels may be varied and the arrangement and angles thereof altered according to the capacity demanded.

Having thus described my said invention, what I claim and desire to secure by Letters Patent is:—

1. In a stove of the character described, a wall element formed as a structural unit comprising a hollow connecting member, a plurality of separated tubes secured to and severally communicating with said hollow member, and connecting sections uniting the opposite, longitudinal sides of said tubes, substantially as specified.

2. In a stove of the character described, a wall element formed integrally as a structural unit comprising a hollow connecting member, a plurality of separated tubes secured to and severally communicating with said hollow member, and connecting sections uniting the opposite, longitudinal sides of said tubes, substantially as specified.

3. In a stove of the character described, a wall element formed as a structural unit comprising a hollow connecting member, a plurality of separated tubes secured to and severally communicating with said hollow member, and connecting sections uniting the opposite longitudinal sides of said tubes, and separate securing means for said panel communicating with said hollow connecting member, substantially as specified.

4. In a stove of the character described, a wall element formed as a structural unit comprising a hollow header, a plurality of separated tubes secured to and severally communicating with said hollow header, and connecting webs uniting the opposite, longitudinal sides of said tubes, substantially as specified.

5. In a stove of the character described, a wall element formed as a structural unit comprising a plurality of headers, a plurality of separated tubes secured to and severally communicating at their opposite ends with said headers, and connecting webs uniting the opposite longitudinal sides of said tubes, and a separate, hollow securing member for said panel communicating with said hollow connecting member, substantially as specified.

6. In a stove of the character described, a wall element formed integrally as a structural unit comprising a pair of headers, a plurality of tubes of relatively small diameter secured at their opposite ends to said headers and severally communicating therewith, and connecting webs for uniting the opposite longitudinal sides of said tubes, substantially as specified.

7. In a stove of the character described, a receptacle inclosing the firepot and combustion chamber having a part of its inclosing walls formed of a plurality of tubes, headers connecting the ends of said tubes, and connecting webs between said tubes, said tubes, headers and connecting webs being formed integrally with each other and jointly constituting a panel, substantially as specified.

8. In a stove of the character described, a receptacle inclosing the firepot and combustion chamber having a part of its inclosing walls formed of a plurality of thin-walled tubes, each having a low value of the ratio that the volume of the metal bears to the external area per unit of radiating surface of said tubes, headers connecting the ends of said tubes, and connecting webs between said tubes, said tubes, headers and connecting webs being formed integrally with each other and jointly constituting a panel, substantially as specified.

9. In a stove of the character described, a receptacle inclosing the firepot and combustion chamber, having a part of its inclosing walls formed of a series of panels, each comprising a plurality of tubes, connecting webs intermediate said tubes, means for establishing communication between said tubes, said tubes, connecting webs and communicating means being formed integrally with each other and forming a panel, and said webs having auxiliary air inlets arranged therein communicating with the combustion chamber, substantially as specified.

10. In a stove of the character described, a receptacle inclosing the firepot and combustion chamber, having a part of its inclosing walls formed of a series of connected panels, each comprising a plurality of tubes, connecting webs, and headers connecting the ends of said tubes; said tubes, connecting webs and headers being formed integrally with each other and jointly constituting a panel, substantially as specified.

11. In a stove of the character described, a receptacle inclosing the firepot and combustion chamber, having part of its inclosing walls formed of a plurality of communicating tubes and connecting webs for said tubes formed integrally therewith and jointly constituting a panel, and members independent of said panels secured to and united with said panels at their opposite ends, substantially as specified.

12. In a stove of the character described, a receptacle inclosing the firepot and combustion chamber, having a part of its inclosing walls formed of a plurality of communicating tubes, and connecting webs for said tubes formed integrally therewith and jointly constituting a panel, and a plurality of hollow connecting members secured to said panels adjacent to their upper and lower ends, substantially as specified.

13. In a stove of the character described, a receptacle inclosing the firepot and combustion chamber, having a part of its inclosing walls formed of a plurality of communicating tubes, and connecting webs for said tubes formed integrally therewith and jointly constituting a panel, and a plurality of hollow connecting members secured to said panels adjacent to their upper and lower ends; said panels having the web portions intermediate of said tubes provided with apertures communicating with the combustion chamber of the stove, substantially as specified.

14. In a stove of the character described, a receptacle inclosing the firepot and combustion chamber, having a part of its inclosing walls formed of a plurality of vertical tubes, connecting webs for said tubes, and headers secured to the opposite ends of said tubes, said tubes, webs and headers being formed integrally and jointly constituting a panel, and a plurality of hollow endless members secured to the headers of said panels whereby to establish communication between the tubes of the several panels constituting said inclosing walls, substantially as specified.

15. In a stove of the character described, a receptacle inclosing the firepot and combustion chamber, having a part of its inclosing walls formed of a plurality of communicating tubes, connecting webs for said tubes and headers at the opposite ends of said tubes; said tubes, connecting webs and headers being formed integrally and jointly constituting a panel, and a plurality of hollow, endless connecting members secured to the headers on said panels, whereby to establish communication between said panels, substantially as specified.

16. In a stove of the character described, a receptacle inclosing the firepot and combustion chamber, comprising a series of connected panels, each consisting of a plurality of vertical tubes, connecting webs, and headers communicating with the opposite ends of said tubes; said tubes, connecting webs and headers jointly forming a panel, means for establishing communication between the tubes of said panels, and certain of said panels having a portion of the webs intermediate said tubes cut away to form a vertical grate, and other of said panels having portions of the connecting webs intermediate said tubes cut away to form an outlet for the products of combustion, substantially as specified.

17. In a stove of the character described, a receptacle inclosing the firepot and combustion chamber, comprising a series of connected panels each consisting of a plurality of vertical tubes, connecting webs and headers communicating with the opposite ends of said tubes; said tubes, connecting webs and headers jointly forming a panel, hollow polygonal connecting members conformed to the inner sides of said receptacle, and one of said connecting members secured to the top and bottom of said receptacle and to each of the panels forming said inclosing walls, and communicating with said headers, substantially as specified.

18. In a stove of the character described, a receptacle inclosing the firepot and combustion chamber, comprising a series of connected panels each consisting of a plurality of vertical tubes of relatively small diameter, connecting webs intermediate said tubes and headers arranged at the upper and lower ends of said tubes, said tubes, webs and headers being formed integrally with each other, hollow connecting members corresponding in outline with the interior walls of said receptacle and secured to the headers at the upper and lower ends thereof and communicating therewith, and a shell or jacket inclosing said receptacle, substantially as specified.

19. In a stove of the character described, a receptacle inclosing the firepot and combustion chamber, comprising side panels each consisting of a plurality of vertical tubes, connecting webs intermediate said tubes, and headers arranged at the opposite ends of said tubes; said tubes, webs and headers being formed integrally with each other, and a transverse panel arranged intermediate said side panels also comprising a series of vertical tubes, connecting webs and headers formed integrally with each other; said transverse panel having its upper and lower headers connected with the upper and lower headers respectively of said side panels whereby to form a partition to the rear of the firepot and combustion chamber, and form a flue intermediate said transverse panel and the rear wall of the receptacle, substantially as specified.

Signed at Paris, France, this 17th day of March, one thousand nine hundred and fourteen.

LOUIS COURTOT.

Witnesses:
CHAS. P. PRESSLY,
MAURICE ROUX.